United States Patent [19]

Bayusik et al.

[11] 4,210,678
[45] Jul. 1, 1980

[54] METHOD OF STERILIZING SPICES

[75] Inventors: Michael J. Bayusik; Peter H. Chen, both of Rochester, N.Y.

[73] Assignee: The R. T. French Co., Rochester, N.Y.

[21] Appl. No.: 936,220

[22] Filed: Aug. 24, 1978

[51] Int. Cl.² .............................................. A23L 3/16
[52] U.S. Cl. ................................. 426/521; 426/506; 426/516; 426/638
[58] Field of Search ............... 426/521, 516, 638, 506, 426/518, 96, 99

[56] References Cited

U.S. PATENT DOCUMENTS

| 2,246,528 | 6/1941 | Musher | 426/638 |
|---|---|---|---|
| 2,529,710 | 11/1950 | Singh | 426/521 |
| 3,642,495 | 2/1972 | Davidson et al. | 426/506 |
| 3,922,354 | 11/1975 | Galluzzi et al. | 426/96 |
| 4,060,645 | 11/1977 | Risler et al. | 426/99 |

FOREIGN PATENT DOCUMENTS 427677  4/1935  United Kingdom ................ 426/638

*Primary Examiner*—S. Leon Bashore
*Assistant Examiner*—George C. Yeung
*Attorney, Agent, or Firm*—Shlesinger, Fitzsimmons & Shlesinger

[57] ABSTRACT

Herbs or spices are sterilized for commercial sale purposes by extruding the products through a small orifice in a die, preferably while maintaining the products at a temperature above approximately 220° F. Before extrusion the herbs or spices are moistened, and then are tempered or allowed to remain in the presence of the moisture until the moisture level thereof has equilbrated to a range of about 16–20% by weight. When the moistened and tempered products are extruded, they expand slightly upon emerging from the die orifice, and are severed into pieces by a rotating knife. The severed pieces may then be ground into any desired particle size.

5 Claims, 3 Drawing Figures

METHOD OF STERILIZING SPICES

This invention relates to the commercial production of sterilized herbs and spices, and more particularly to an improved method for effecting sterilization of these items without having to employ harmful chemical agents.

It is well known to those skilled in the art that some herbs and spices contribute significant numbers of microorganisms to foods, even though they may be used in relatively minor quantities in the food. In the past, studies have shown that certain spices, such as black pepper, celery or paprika characteristically have high microbiological counts, while others such as clove, nutmeg, or mace, do not. It has also been shown that spore-forming bacteria in spices may lead to spoilage of canned foods and processed meat products. The cause of the high microbiological counts for the most part is due to poor sanitary conditions in many of the spice-producing countries.

While it has been suggested that certain extruded food products will experience a lowering of spore and/or bacterial count as the result of being subjected to an extrsuion operation (see Food Engineering, pg. 101, Sept. 1977; Principles & Applications of Extrusion Cooking, CTU-Symposium, Paris, France, Jan. 1977) most of these efforts have been directed to the extrusion of soy flour compositions, and frequently are the result of an extrusion cooking operation, or an operation designed to extract fluids (oils, etc.) from the extruded product.

Contrary to cooking or extracting operations, the instant invention is designed to sterilize herbs and spices without causing any undue volatilization of oils, and without cooking the products. Moreover, as noted hereinafter, the invention obviates the need for employing any additives, except increased moisture, during the sterilization process.

At the present time, the commercially acceptable process for reducing the microbiological counts of herbs and spices of the type described is by means of fumigation with ethylene oxide. The use of ethylene oxide, however, has the disadvantage that it produces residues, for example chlorohydrins, which in themselves are toxic substances. Basically the chlorohydrins are produced by two chemical reactions. First ethylene oxide slowly reacts with water or moisture in the spices to form glycols; and thereafter the resulting glycols combine with chlorides, which naturally occur in the spices, to form chlorohydrins.

There is not absolute proof that chlorohydrins can be harmful to humans in the amounts that might be ingested by way of spices in a normal diet. Tolerance levels, however, have been proposed and undoubtedly will continue to be monitored and updated to ensure the existence of a "safe" level of chlorohydrins in spices and herbs.

A primary object of this invention, therefore, is to provide an improved method of commercially producing sterilized herbs and spices of the type described. To this end it is an object also to provide a novel sterilizing process which eliminates the need for employing agents such as ethylene oxide for sterilizing these materials.

Another object of this invention is to provide a novel method of sterilizing herbs and spices, which simultaneously effects a physical change in their configurations, and generally results in a substantially better retention of volatile oils in the herbs and spices, as compared to conventional methods of sterilizing and grinding these items.

A more specific object of this invention is to effect commercial sterilization of herbs and spices by successive steps of extruding and grinding the spices to provide a ground product having extremely low microbiological counts.

Other objects of the invention will be apparent hereinafter from the specification and from the recital of the appended claims, particularly when read in conjunction with the accompanying drawing.

Figure 1:
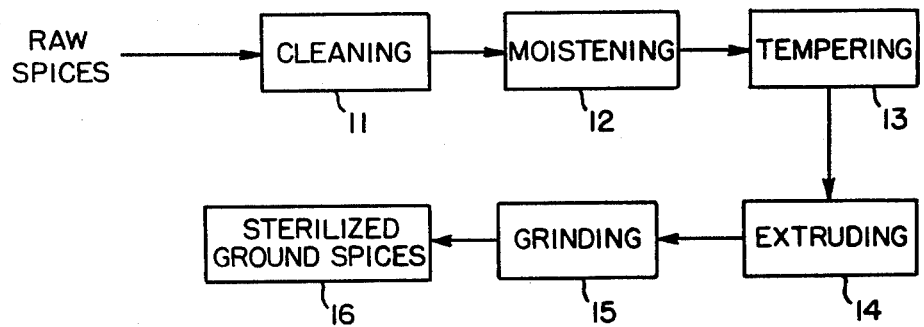
FIG. 1 is a flow chart illustrating diagrammatically the several process steps involved in the commercial production of sterilized spices or herbs in accordance with one embodiment of this invention.

Referring now to the drawing by numerals of reference, and first to FIG. 1, numerals 11 through 16 denote several successive operations, or process steps, which are performed on the raw spices or herbs during the commercial production and sterilization thereof in accordance with one embodiment of this invention. In the first step 11, whole or cracked herbs and/or spices with moisture ranges of from 8 to 14% by weight are cleaned by any established commercial practice to remove dirt, stones and other foreign materials. The cleaned spices and/or herbs are then subjected to a moistening step 12, also in any conventional manner, to raise the moisture content thereof to a range of approximately 16 to 20%. The moistened material is then allowed to sit or temper as at 13 for approximately 30 to 60 minutes in order to bring about equilibrium of the moisture content throughout the particular herb or spice.

After moistening and tempering the materials are subjected to an extrusion process 14 under high temperatures and pressures in a manner that will be described in more detail hereinafter. This extrusion step destroys the microorganisms which might otherwise contaminate the materials, and also tends to increase the porosity of the materials. After extrusion the herbs and/or spices are cut and ground as denoted by step 15 to produce a desired granulation, once again by means of any commercially available apparatus.

The result, as denoted at 16, is a commercially sterilized, ground spice or herb which is completely free of any residual chlorohydrins, which otherwise would be present if the sterilization process had been performed in accordance with conventional processes.

Moreover, the extrusion step appears to reduce the resistance of the herb or spice to grinding, since the extruded products have been found to require substantially less energy to effect satisfactory grinding thereof.

Figure 2:
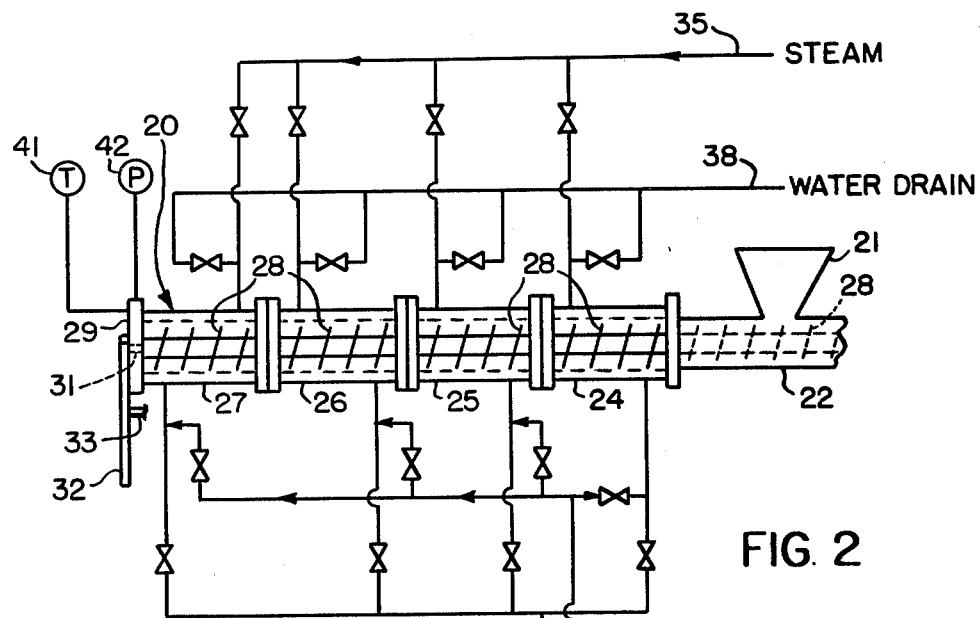
FIG. 2 is a diagrammatic side elevational view of an extruding and severing mechanism which is utilized in performing certain of the process steps in accordance with this invention.
Figure 3:
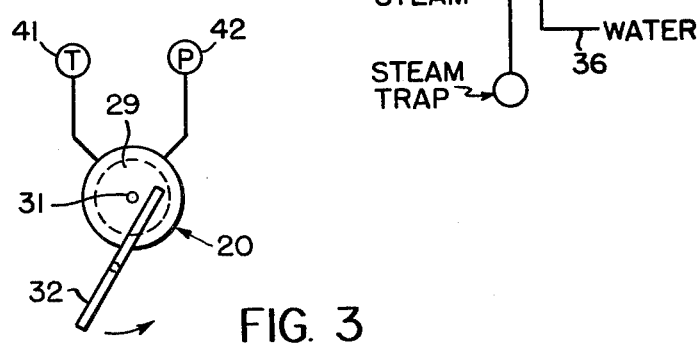
FIG. 3 is an end view of this extruding mechanism, as viewed when looking toward the left end of the mechanism as shown in FIG. 2.

Referring now to FIG. 2, which illustrates in greater detail the extrusion step in this process, 20 denotes generally a conventional or commercially-available extruder having a hopper 21 connected to its inlet end 22 for the purpose of supplying tempered herbs or spices to the extruder. In the embodiment illustrated, the extruder 20 has four, successive, annular steam jackets 24, 25, 26 and 27 the registering bores of which form an elongate, cylindrical chamber through which a rotatable feed screw or worm 28 extends coaxially in known manner from the extruder inlet end 22 to a die 29, which is mounted in the outlet end (left end in FIG. 2) of the extruder. In its center the die has small aperture 31 through which the herbs or spices are extruded in the form of a "rope" into a path of a rotating fly knife 32. Knife 32 is mounted by its shaft 33 to rotate across the face ot the die 29, and transversely of the extruding opening 31, thereby to shatter or sever the extruded "rope" of spice as it is forced out of aperture 31.

The extruder 20 is provided also with the usual steam supply line 35, water supply line 36, steam drain line 37, and water drain 38, all of which are connected by conventional valving to the four chambers 24 through 27 in the extruder in a conventional manner which will not be described in detail herein, It will be apparent, however, that by a proper manipulation of the valving system a temperature gradient can be maintained in the chambers 24 through 27, so that the tempered herbs and/or spices, which are driven by the screw 28 through the extruder 20, can be elevated to a predetermined temperature by the time they reach the extrusion opening 31 in the die 29.

To determine the temperature and pressure of the product as it reaches the die 29, a temperature guage 41 and a pressure guage 42 are mounted on the die to monitor and record these conditions.

In use, tempered herbs or spices are fed through the hopper 21 to the extruder inlet 22, from which they are advanced axially through the feed chamber by the rotating screw 28, and finally out of the die aperture 31. Heat is applied to the herbs or spices selectively through the use of the steam jackets 24 through 27, which surround the feed chamber containing the screw 28, and also as a result of the internal friction which is generated in the materials as they are forced through the extruder by the screw. At the same time, pressure is applied to the materials by the formation of steam, which is brought about by the volatilization of the moisture in the herbs or spices enclosed in the extruder, and also by the physical compression of the spice or herb due to the internally revolving screw 28. When the heated and compressed mass of herb or spice exits through the die opening 31, it expands or puffs due to its sudden release to atmospheric pressure. At this point the moisture level of the extruded herbs and/or spices will fall to a range of about 8 to 12%.

The heat in the extruder, and the sudden release of the materials to atmospheric pressure, significantly reduce the microbial population of the spice or herb. Moreover, this sudden release to atmospheric pressure causes the moisture in the herb or spice to volatilize and form small, porous spaces throughout the herb or spice, thus reducing the effort it would otherwise take to grind the extruded product to a desired particle size. The principal flavor components of a herb or spice are known to be its volatile oils. Minor portions of these oils are volatilized and driven off immediately at the exit of the die where expansion takes place. The major portion of these volatile oils, however, are trapped in the pores or spaces that are formed in the extruded herb or spice.

The form or shape of the extruded herb or spice will depend on the shape of the restricted opening 31 in the die 29. In the embodiment illustrated a round, circular opening has been employed, and operates to form a "rope" of extruded herbs and/or spices, which is then cut into various lengths by means of the rotating knife 32. Obviously, the faster the knife 32 rotates, the smaller will be the length of each section that is cut from the "rope" of extruded materials. These pieces can be, for example, approximately ¼" in length.

Although the die opening 30 has been described as being circular, it will be apparent to one skilled in the art that the particular configuration of this opening may vary as desired. Likewise, it should be understood that the examples set forth hereinafter are merely exemplary, and are not to be construed as limiting the invention.

EXAMPLE 1

A raw spice, the whole berry, allspice, was cleaned to remove foreign materials. In a Hobart Mixer, tap water was added with moderate agitation to raise the moisture level of the allspice from 9.9 to 20.0%. The mixture was alloweed to stand or temper for forty-five minutes in order to permit the moisture to equilibrate. Following tempering, the allspice was fed to the extruder 20 at the rate of 48 pounds per hour. The extruder 20 was fitted with a die 29 having a circular opening of ⅛" diameter. Both temperature and pressure monitoring gages 41 and 42 were mounted on the die 29. Steam was applied to two of the four jackets 24 through 27, for example to the jackets 25 and 26, to maintain a temperature of 215° F. at the die 29 as indicated by the gage 41. The pressure monitored at the die was maintained at approximately 1,000 psig. A "rope" of allspice was extruded and cut off by the rotating knife 32 into approximately ¼" lengths. The extruded material was then ground, analyzed for moisture, volatile oil and microbial population. The results are as follows:

TABLE 1

|  | Raw Material | Extruded Spice (ground) |
|---|---|---|
| Volatile Oil (%) | 3.6 | 3.3 |
| Moisture (%) | 9.9 | 10.9 |
| Standard Plate Count | 740,000/gm | <10/gm |
| Mold | 3,900/gm | <10/gm |

As can be seen from the above results, the plate count and mold count of the raw allspice was significantly reduced by the process disclosed herein.

EXAMPLE 2

Raw, whole ginger was first cleaned to remove foreign material. The ginger was then ground or cracked to an average size of ⅜". In a Hobart Mixer, tap water was added with moderate agitation to raise the moisture level of the ginger from 8.5% to approximately 20.0%. The mixture was allowed to temper for forty-five minutes. Following tempering the ginger was fed to the extruder 20 at a rate of 39 pounds per hour. The extruder was fitted with a die 29 having, again, a circular aperture or opening of ⅛" diameter. Steam was applied to two of the four steam jackets (for example jackets 26 and 27) of the extruder to maintain a temperature of 215° F., as measured by the gage 41, to the die 29. The pressure monitored at the die was 900 psig. A "rope" of ginger was extruded and cut off by the rotating knife 32 into approximately ¼" lengths. The extruded ginger was then ground, analyzed for moisture, volatile oils and microbial population. The results were as follows:

TABLE 2

|  | Raw Material | Extruded Spice (ground) |
|---|---|---|
| Volatile Oil (%) | 2.6 | 2.2 |
| Moisture (%) | 8.5 | 8.2 |
| Standard Plate Count | 16,500,000/gm | <10/gm |
| Mold | <10/gm | <10/gm |

Table 2 shows that the plate count of the raw ginger was significantly reduced by the process which forms the subject matter of this invention.

While only two specific examples have been set forth above, it will be apparent to one skilled in the art that the invention is still capable of further modification, For instance, apart from the two specific examples shown above, other herbs and/or spices may be treated in accordance with the teachings of this invention, in which case higher or lower extrusion pressures may be used, for instance in the range of from 200-1500 psig. Moreover, it will be apparent also that this application is intended also to cover any such modifications as may fall within the scope of one skilled in the art or the appended claims:

Having thus described our invention what we claim is:

1. A method of commercially sterilizing edible materials selected from the group consisting of herbs and spices in their raw forms by extruding them through a small opening in a die, comprising
    raising the moisture level of the raw herb or spice prior to the extrusion step by mixing water with the herb or spice and allowing the mixture to stand until the moisture equilibrates in the herb or spice to a range above approximately 8-14% by weight,
    heating the moistened herb or spice to a temperature above approximately 200° F. by passing it through a heating chamber without introducing any steam into the chamber, apart from that which may emanate from the moistened herb or spice, and
    forcing the moistened and heated herb or spice through a die opening under an extrusion pressure in the vicinity of 200-1500 psig thereby to reduce the spore and microbiological counts of the herb or spice to satisfactory levels.

2. A method of producing commercially sterilized edible materials selected from the group consisting of herbs and spices in their raw forms, comprising
    cleaning the raw herbs or spices,
    moistening the cleaned herbs or spices to raise the moisture level thereof to an equilibrated level above 8-14% by weight,
    raising the temperature of the moistened spice or herb to a value well above room ambient temperature without exposing it to any additional moisture,
    extruding the moistened and heated herbs or spices through a die having a relatively small orifice, and at an extrusion pressure in excess of 200 psig., thereby to reduce the spore and microbiological counts of the herbs or spices to satisfactory levels,
    breaking up the extruded material into small pieces, and
    grinding said pieces into granular form.

3. A method as defined in claim 2, wherein said moistening step comprises raising said moisture level to a range of approximately 16-20% by weight.

4. A method as defined in claim 3, wherein said moistening step includes mixing water with said herb or spice and allowing the mixture to stand for somewhere in the approximate range of 30 to 60 minutes to enable the moisture to equilibrate in the moistened herb or spice.

5. A method as defined in claim 2, including maintaining the herbs or spices are at a temperature above approximately 200° F. during said extrusion step.

* * * * *